(No Model.) 2 Sheets—Sheet 1.
J. WAGNER & G. B. SUNDERLAND.
HORSESHOEING RACK.
No. 481,083. Patented Aug. 16, 1892.
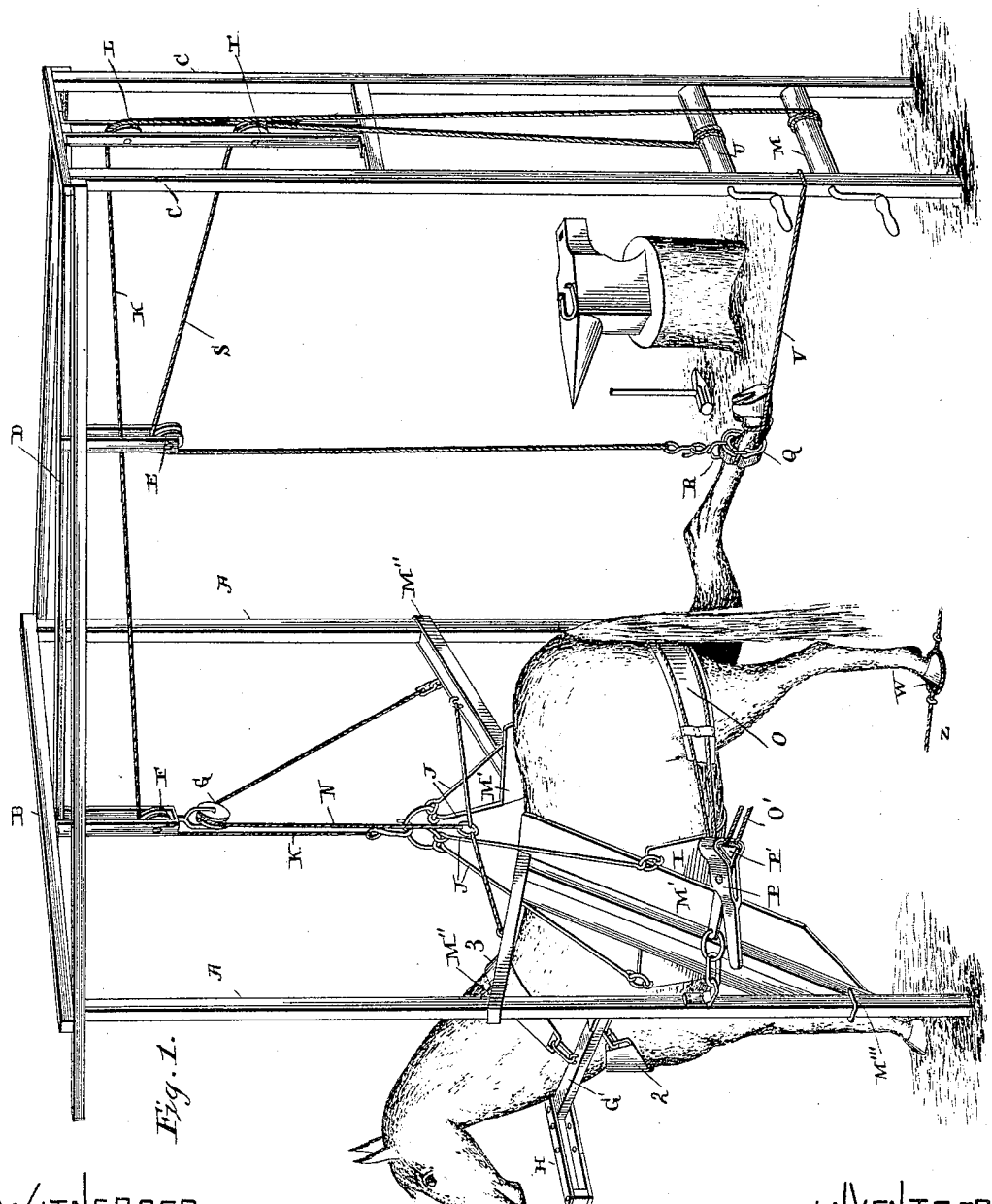

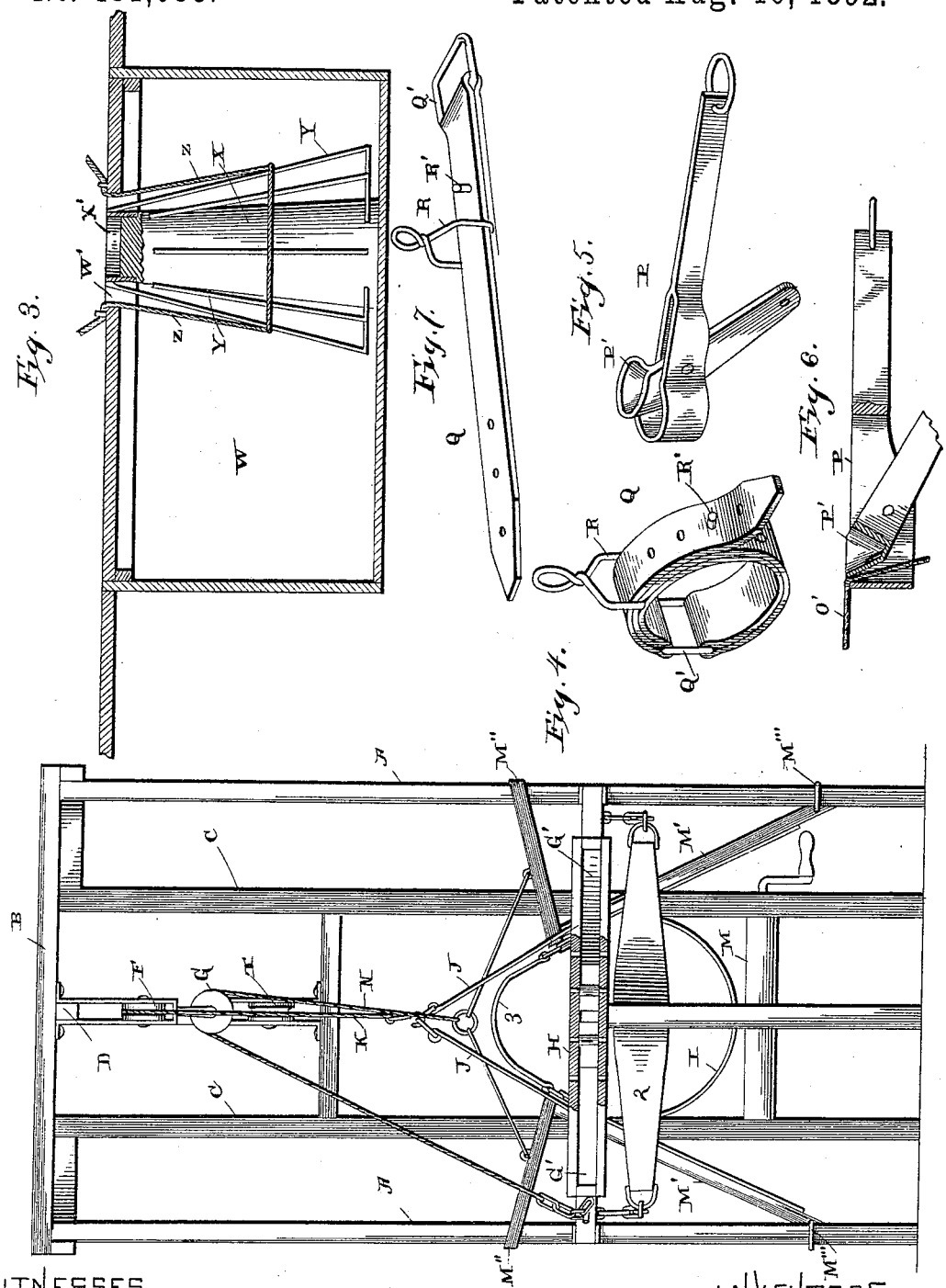

UNITED STATES PATENT OFFICE.

JOHN WAGNER AND GEORGE B. SUNDERLAND, OF MARIETTA, OHIO.

HORSESHOEING-RACK.

SPECIFICATION forming part of Letters Patent No. 481,083, dated August 16, 1892.

Application filed February 12, 1892. Serial No. 421,325. (No model.)

*To all whom it may concern:*

Be it known that we, JOHN WAGNER and GEORGE B. SUNDERLAND, of Marietta, in the county of Washington and State of Ohio, have invented certain new and useful Improvements in Horseshoeing-Racks; and we do hereby declare the following to be a full, clear, and exact description of the invention, such as will enable others skilled in the art to which it pertains to make and use it, reference being had to the accompanying drawings, which form part of this specification.

Our invention relates to an improvement in horseshoeing-racks; and it consists in certain novel features of construction and in the combination and arrangement of parts, which will be fully described hereinafter, and more particularly referred to in the claims hereto annexed.

The object of our invention is to construct an improved device for holding vicious horses while being shod, whereby the shoer is enabled to perform his work without being in danger of receiving kicks or bites from the animal.

Referring to the accompanying drawings, Figure 1 is a perspective view of our improved device. Fig. 2 is a front view of the same. Fig. 3 is a longitudinal sectional view of the foot-holding box. Fig. 4 is a detached view of the strap for lifting the leg. Fig. 5 is a similar view of one of the rope clamps. Fig. 6 is a sectional view of the same. Fig. 7 is a view of the strap Q, showing it stretched out.

A represents the two parallel vertical posts, which are connected at their upper ends by the cross-piece B, and between these posts the animal is placed while being operated upon. Vertical posts C are connected to the posts A by the horizontal beam D, from which depends the pulley E. Suspended from the cross-piece B and immediately beneath the beam D are the pulleys F G, for the purpose presently to be described.

Pivotally connected to the posts A are the outwardly-extending converging bars G', which are made adjustable in relation to each other by means of the horizontal rack H, to which the said bars are pivotally connected. These bars prevent the animal from going too far ahead in the device, and at their ends they fit the neck of the animal in such a manner as to prevent him from lowering his head for the purpose of biting. By means of the adjustment at their outer ends they can be accommodated to animals of different sizes.

I represents a girt or sling which passes around the animal's belly and which is provided at its ends with the loops J, which are hooked to the lower end of a rope K, which passes up over the pulley F and rearward therefrom to the pulley L, over which it passes and from which it drops to the drum M, and by means of the latter the said rope is drawn upward, tightening the girt around the animal and partially supporting his weight.

In order to prevent the animal from moving either to one side or the other, we provide the sloping clamps or stops M', which are adjustable vertically on the posts A and which fit the sides of the horse in such a manner as to lock him in one position, and by this means all lateral movement is dispensed with. The loops M'' encircle the said posts from the upper ends of the stops and the links M''' from the lower ends thereof. The stops M' are adjusted vertically by means of the line N, to which they are connected and which passes upward over the pulley G, its free end being secured in any suitable manner to the frame.

For preventing the animal from moving rearward we provide the band O, which passes around the hind quarters of the horse and which is provided at its ends with the ropes O', which are secured to the clamps P on the posts A. These clamps consist of a loop, in the arms of which is pivoted the dog P', the inner end of which bears against the rounded inner side of the loop and the outer end is connected to the post A, by means of which the clamp is supported. It will be seen that the ropes O' pass over the edge of the said rounded portion of the loop and through the same, in which they are clamped by the said dogs. By this arrangement the tighter the said ropes are drawn the more securely they are held in the clamps.

For raising the horse's leg for the purpose of placing a shoe a strap Q is provided, which encircles the leg. This strap has secured to one end the link Q' and between its ends a second link R. The free end of the strap is passed around the link Q', then back through the link R, where it is secured to a projecting point R' on the body of the same, as shown in Fig. 4. Connected to the link R is the line S, which passes up over the pulley E and backward over the pulley T, from which it drops to the drum U, and by this arrangement the animal's leg is elevated to the desired height and so held while the shoe is being placed. The line S simply elevates the limb, and for drawing the same rearward, so as to hold it in an outstretched position, a rope V is provided, which may be secured to the framing in any suitable manner. For the purpose of preventing the horse from kicking with the other hind leg not being operated upon, we provide a boxing W, which is placed with its top flush with the floor and which is formed with an opening W', as shown. Immediately beneath this opening and within the said boxing is located a post X, and secured to this post are the rods Y, which are arranged around the same and which diverge therefrom toward their lower ends. A rope Z is wrapped loosely around these rods with its ends projecting from the opening W'. The foot, which it is desired to secure is then placed within the opening and resting upon the said post. When in this position, the ends of the rope Z are drawn upon, which contract the loop formed around the rods Y, and as the said rods slope inward toward their upper ends the loop slides upward thereon and around the foot resting upon the post X. The ends of the rope are then secured in any suitable manner, and the foot is thus bound to the floor and the animal prevented from moving it until released. In order that the loop may slide freely upward around the foot a band X' is provided, which projects upward from the post X, and within this band and resting upon the top of the post the foot is placed. The band thus provided enables the rope to be slipped up and around the foot with ease.

A breast-strap 2 is provided, which is secured at its opposite ends to the posts A, and a strap 3, having its ends secured to the bars G, is also provided, which passes over the horse's shoulders. Thus it will be seen that by means of the several straps and bands employed it is practically impossible for the animal to move in any direction while being operated upon, and that in consequence thereof the operator is in no danger of being injured by him, no matter how vicious he may be.

Having thus described our invention, we claim—

1. The combination, with a frame in which the animal is placed and a band for preventing him from moving rearward therein, of loops through which the ends of the said band pass and dogs which are pivoted in the said loops and which bear against the said band ends, the outer ends of the dogs being secured to the frame, substantially as shown and described.

2. In a device of the character described, the combination, with a boxing provided with an opening in its upper side and a post within the box below the opening, of rods arranged around the post and diverging downward from the upper end thereof and a rope which is looped around the said rods, for the purpose substantially as shown and described.

3. The combination, with the uprights A and upwardly-converging braces M', of loops at the lower end of said braces and loop-arms M'', projecting from the upper ends of the braces, all of said loops encircling the uprights and adapted to move vertically thereon, substantially as shown and described.

4. The combination of a frame, movable braces projecting inward from opposite sides thereof, an elevating-line, diverging ropes at the lower end of said line, which are secured at their respective outer ends to the adjustable braces, and means for elevating the line, substantially as shown and described.

In testimony whereof we affix our signatures in presence of two witnesses.

JOHN WAGNER.
GEORGE B. SUNDERLAND.

Witnesses:
I. C. ELSTON, Jr.,
A. L. SMITH.